3,321,693
INVERTER AND SWITCHING SCHEME THEREFOR

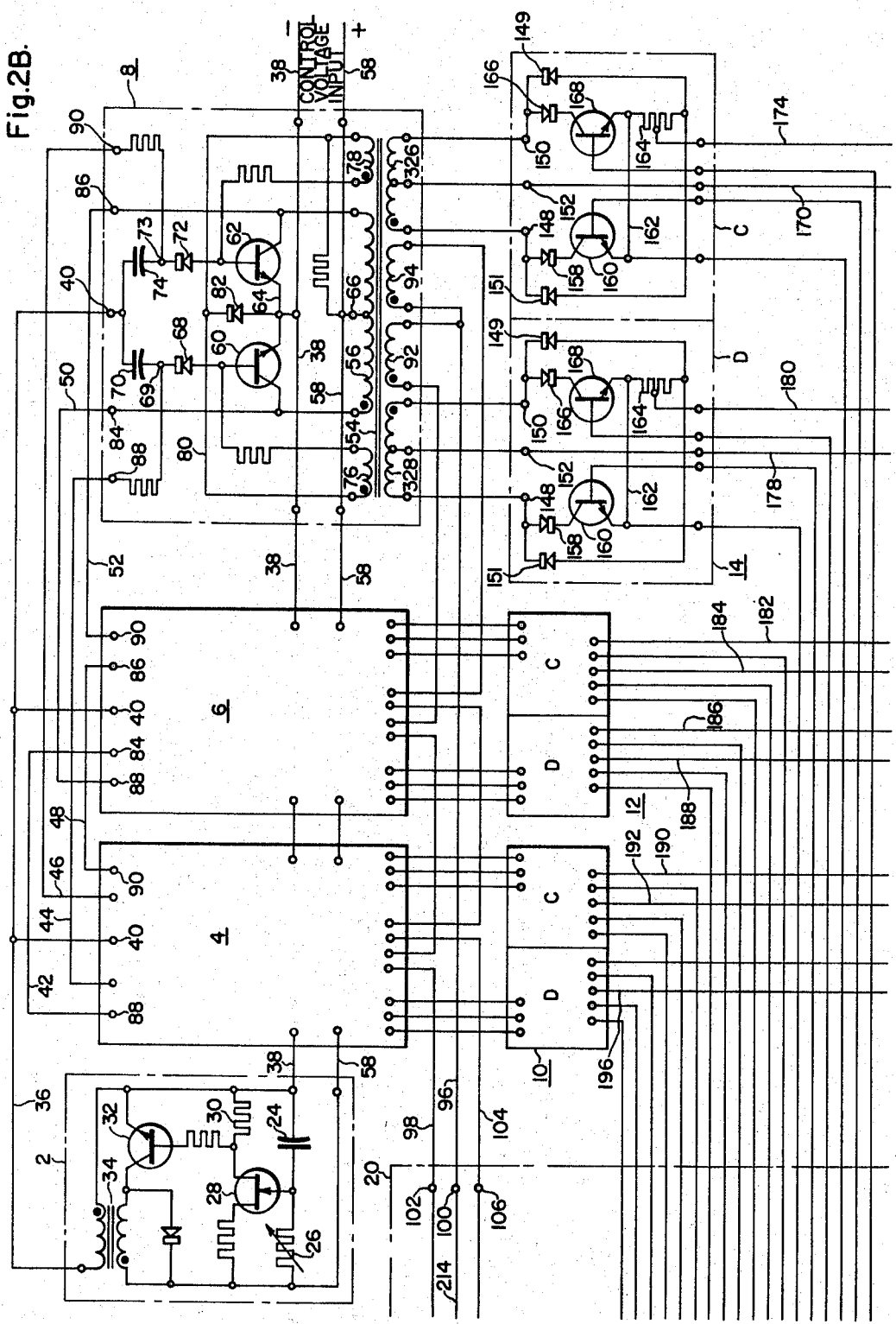

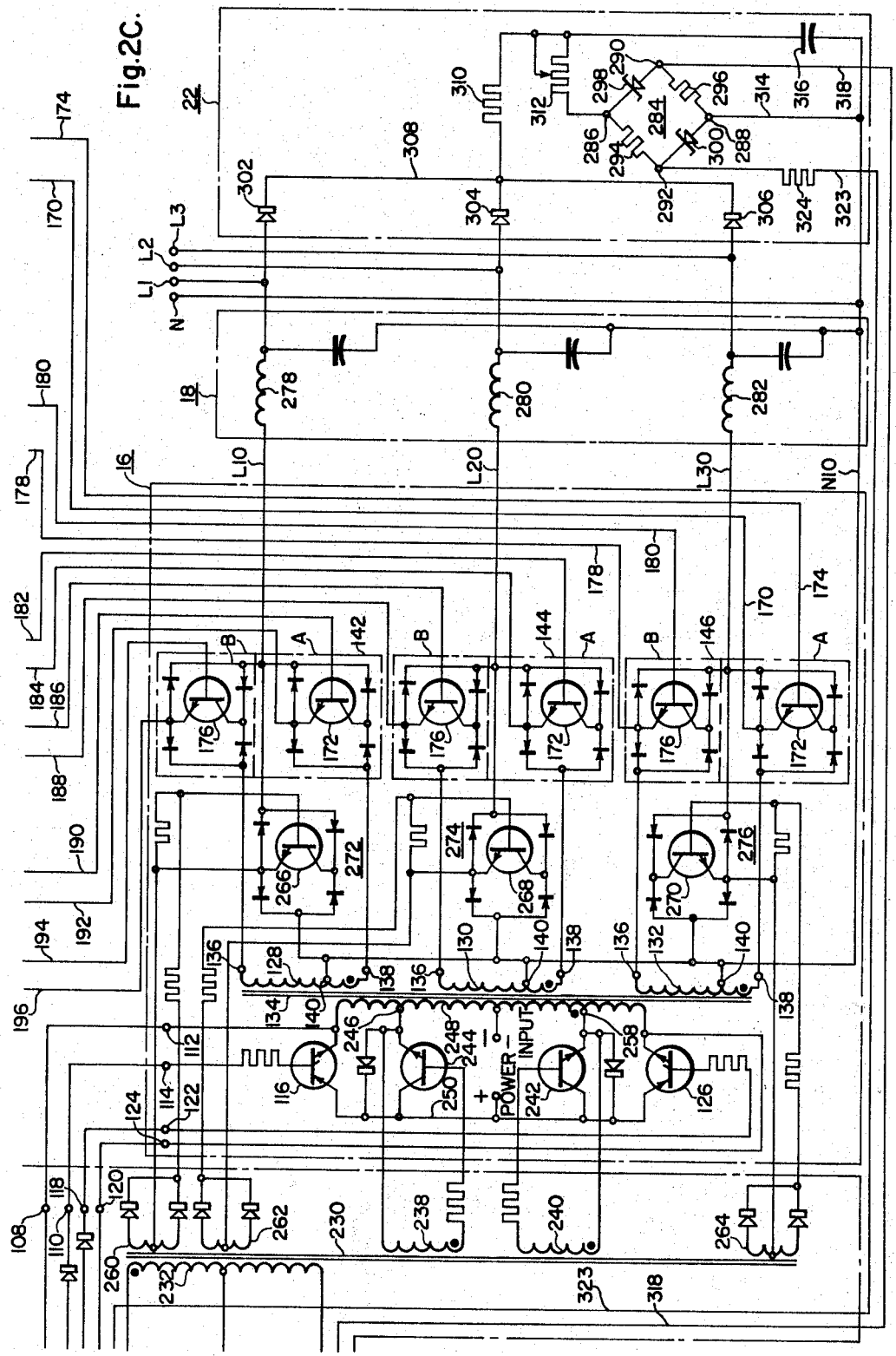

Theodore M. Heinrich and Andress Kernick, Lima, Ohio, assignors to Westinghouse Electric Corporation, East Pittsburgh, Pa., a corporation of Pennsylvania
Filed Nov. 6, 1963, Ser. No. 321,834
21 Claims. (Cl. 321—5)

This invention relates to apparatus for inverting unidirectional potential into alternating potential.

An object of this invention is to provide an inverting mechanism of lightweight which is adapted, among other uses, for embodiment in airborne apparatus.

Another object of this invention is to provide an apparatus in which the power transformer is operated at a higher frequency than the output frequency of the inverter.

Another object of this invention is to provide such an inverter in which square waves of varying amplitude are combined together to provide the output voltage wave.

Another object of this invention is to provide means for interrupting the current flow through discontinuous type control valves by means of valves having a substantially lesser current capacity than the discontinuous type control valves.

Another object of this invention is to provide an inverter which is disconnected from the load during polarity reversing operation of the power inverter.

Figure 1:
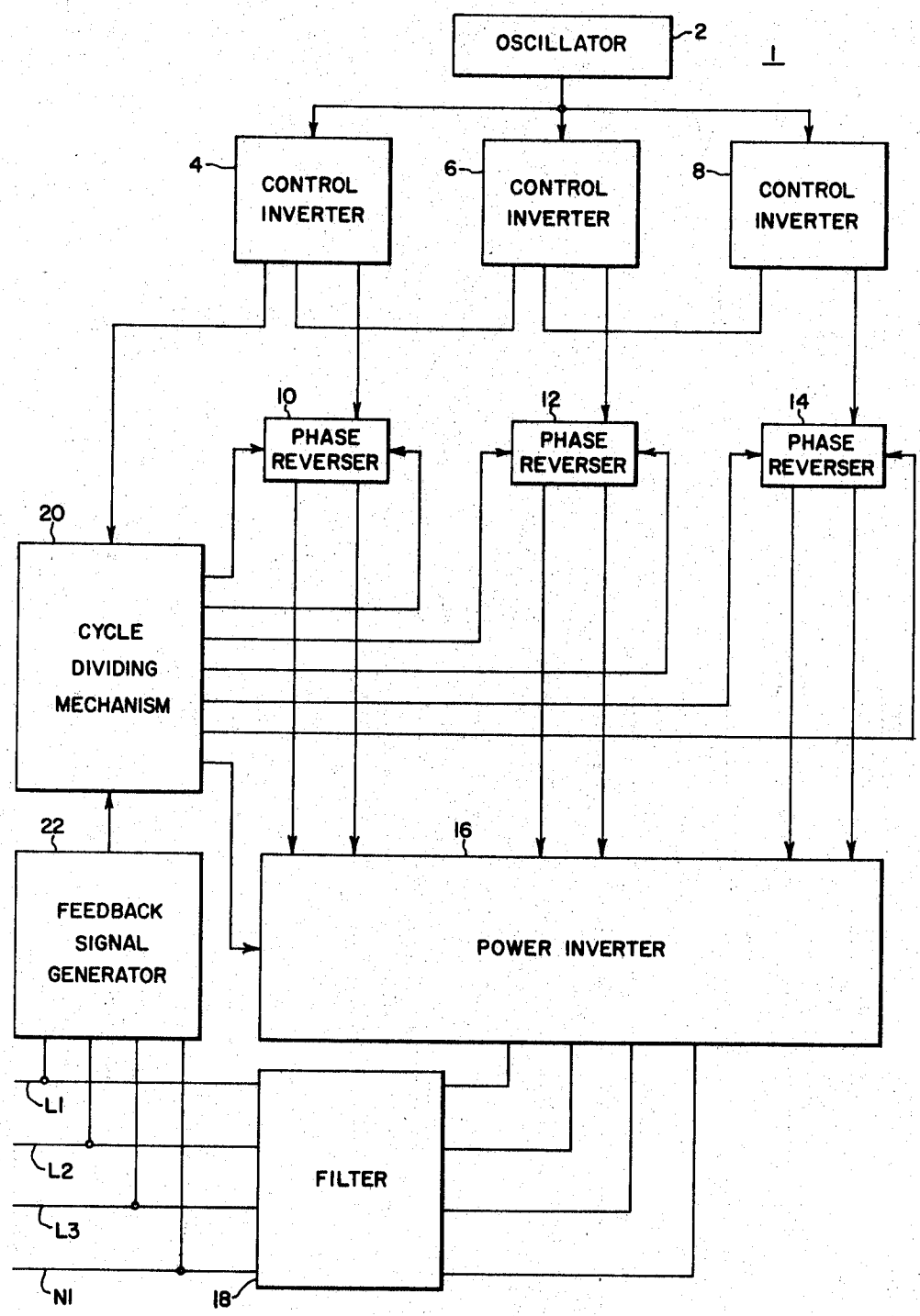
Figure 2A:
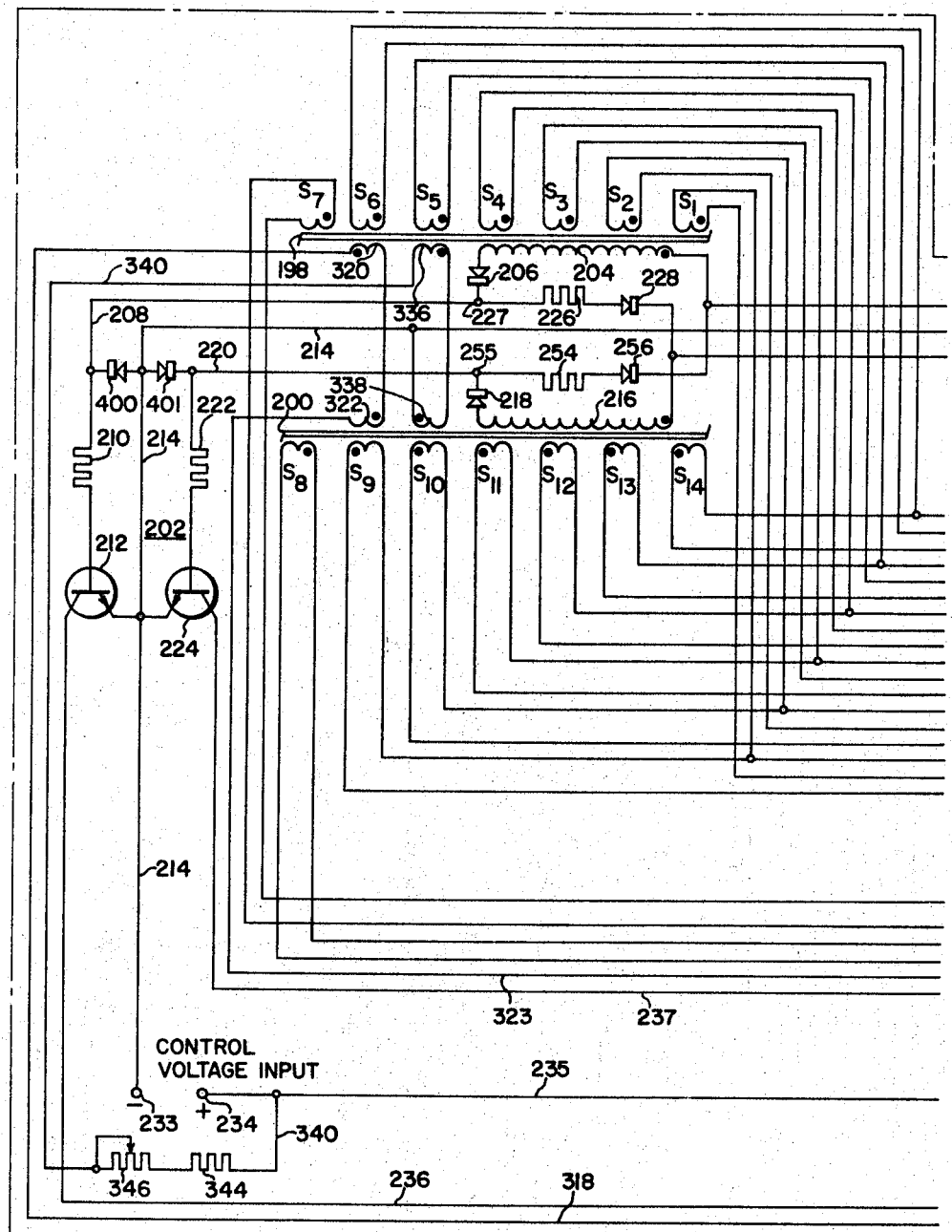
Figure 3:
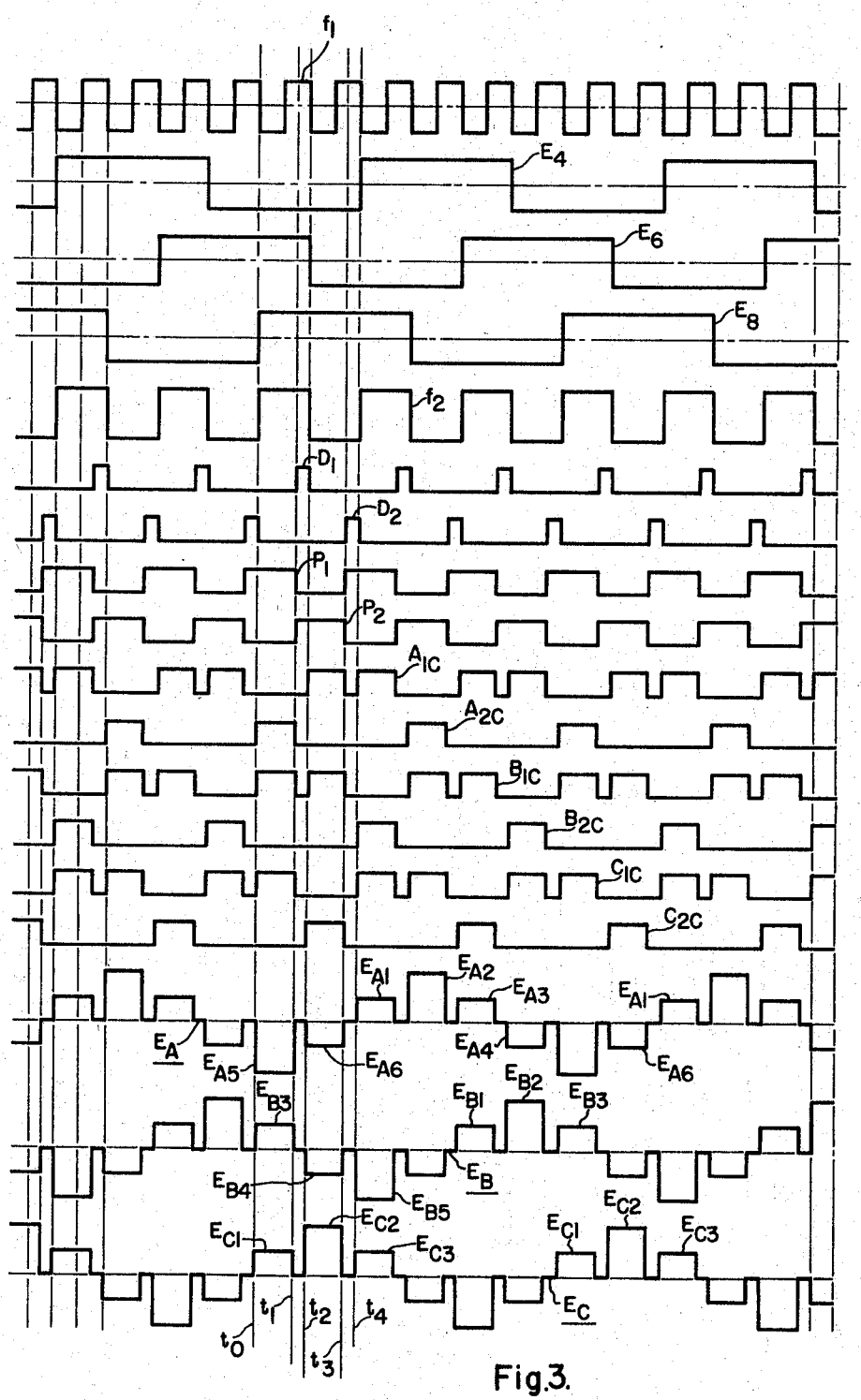

Other objects of this invention will be apparent from the specification, the appended claims and the drawings in which:

FIGURE 1 is a block diagram illustrating an inverter embodying the invention;

FIGS. 2A, 2B and 2C when combined together illustrate, schematically, the circuits of the inverter illustrated in FIG. 1; and, FIG. 3 is a family of curves illustrating certain of the operating relationships of the apparatus.

Referring to the drawings by characters of reference the numeral 1 indicates generally a three phase inverter for providing three phase voltage to the lines L1, L2, L3 and N1. The inverter network is driven by an oscillator 2 which drives control inverters or flip-flop networks 4, 6 and 8 which generate three square-wave output voltages relatively spaced 120 electrical degrees. The output voltages from the control inverters 4, 6 and 8 are supplied to phase reversing networks 10, 12 and 14 respectively. These phase reversing networks 10, 12 and 14 are connected to drive a three phase power inverting network 16, the output of which is supplied through a filter 18 to the output conductors L1, L2, L3 and N1.

The phase reversing networks 10, 12 and 14 are controlled from a cycle dividing mechanism 20 which is driven from a signal derived from the control inverters 4, 6 and 8. The cycle dividing mechanism determines the portion of the half cycles of the output voltage that the power inverter 16 is supplying power from its source of unidirectional electrical energy and consequently the output voltages applied to the lines L1, L2, L3 and N1. A feedback signal generator 22 is energized from the output conductors and supplies a control signal to operate the dividing mechanism 20 for regulating the cycle dividing mechanism and thereby the pulse time of the power inverter 16.

The oscillator 2 may take any of a number of forms and the form shown in FIG. 2B (wherein the charging time of a control capacitor 24 through a control resistor 26 controls the conductive period of a unijunction transistor 28) is to be taken as illustrative and not limitative. Each time that the transistor 28 conducts the capacitor 24 discharges through a resistor 30. When energized the resistor 30 biases a transistor 32 into conduction to energize an output transformer 34. The output transformer is connected between an output bus 36 and the negative control voltage input bus 38. The bus 36 is connected to an input terminal 40 of each of the control inverters 4, 6 and 8. As will be explained below, the inverters 4, 6 and 8 are also interconnected by means of conductors 42, 44, 46, 48, 50 and 52 so that solely one of the control inverters is actuated each time the bus 36 is rendered negative.

The circuitry of each of the control inverters 4, 6 and 8 is identical and only the circuitry of control inverter 8 is illustrated in detail. The output power is derived from an output transformer 54 having a center tapped primary winding 56 energized in opposite polarity from the control voltage input buses 38 and 58 through a pair of switching transistors 60 and 62. The emitters of the transistors 60 and 62 are each connected to a common emitter bus 64 which is connected to the negative control voltage input bus 38. The collectors of the transistors 60 and 62 are connected to opposite end taps of the primary winding 56. The center tap 66 of winding 56 is connected to the positive control voltage input bus 58.

The transistors 60 and 62 are maintained conductive and non-conductive, as the occasion demands, by means of feed-back voltages derived from the output transformer 54. The reversing of the conductive conditions of the transistors 60 and 62 is accomplished as set out above by a signal applied to the input terminal 40. For these purposes, the bases of the transistors 60 and 62 are individually connected through a diode 68 and capacitor 70 and a diode 72 and capacitor 74 respectively to the control input terminal 40. For regenerative action, the transformer 54 is provided with tertiary feedback windings 76 and 78; one terminal of each being connected individually to the bases of the transistors 60 and 62 through usual current limiting resistors while the other terminals are connected to a common conductor 80. The conductor 80 is connected through a diode 82 and the common emitter bus 64 to the emitters of the transistors 60 and 62. The phasing of the windings 76 and 78 is such that the current supplied to the base circuit of the transistors 60 or 62 maintains the conducting transistor fully conductive and the non-conducting transistor non-conducting.

Assume the transistor 60 is conducting and current is flowing from the control input bus 58 to the center tap 66 and therefrom through the left-hand portion of the primary winding 56, collector to emitter in the transistor 60 and the common emitter bus 64 to the negative control voltage input bus 38. This flow causes the dotted terminals of the windings of the transformer 54 to be negative with respect to the undotted terminals whereby the winding 76 causes current flow through the control resistor, base to emitter of the transistor 60, the common emitter bus 64, the diode 82 and conductor 80 to maintain the transistor 60 fully conducting. At the same time, the winding 78 will have its negative terminal connected to the base of the transistor 62 and its positive terminal connected by way of the conductor 80, diode 82 and emitter bus 64 to the emitter of the transistor 62 whereby this transistor is maintained fully blocked.

The control inverters are provided with control potential output terminals 84 and 86 connected respectively to the end terminals of the primary winding 56 and are connected to control potential input terminals 88 and 90 of the prior to be operated one of the sequentially actuated inverters respectively. The terminal 88 is connected through a voltage dropping resistor to the common point 69 between the diode 68 and capacitor 70 while the control terminal 90 is connected through a similar resistor to the common point 73 between the diode 72 and the capacitor 74. Therefore when transistor 60 conducts, the terminal 84 will be maintained substantially at the potential of the negative bus 38 while the output terminal 86 will be maintained at a positive potential which is equal to substantially twice the potential which exists between the buses 38 and 58 due to the action of the transformer 54. The reverse voltage condition will occur when the transistor 62 is conducting.

Assuming no potentials are supplied to the terminals 88 and 90, each time the oscillator 2 supplies a potential between the buses 36 and 38 in a polarity to make the bus 36 negative with respect to the bus 38, the potential of the input terminal 40 is lowered enough so as to reduce the potential of the terminals 69 and 73 below the potential of the base of the transistors 60 and 62. This reduction has no effect on the non-conducting one of the transistors, but will cause the drive current of the conducting one of the transistors to be diverted from its base and flow through the diode 68 into the capacitor 70 whereby the transistor will rapidly become non-conducting. This causes a reduction of the flux in the core of the transformer 56 to its residual value. This reduction of flux reverses the output potential of the tertiary windings 76 and 78 whereby their dotted terminals become positive and their undotted terminals become negative. The winding 78 will then supply base drive current to the transistor 62 which will then conduct. The winding 76 will cause the transistor 60 to remain non-conductive.

Due to the regenerative action, the transistor 62 soon assumes a fully conductive condition and the transistor 60 a fully blocked condition. Under these conditions, current flows from the positive control voltage input bus 58 through the right-hand portion of the primary winding 56 and collector to emitter in the transistor 62 to the negative control voltage input bus 38. Current flowing in this direction through the winding 56 builds up flux in the core of the transformer 54 in a direction to render the dotted terminals of this transformer 54 positive with respect to the undotted terminals.

The next time that the oscillator 2 pulses the bus 36 negative, the conducting transistor 62 will become non-conducting and the transistor 60 will conduct. It will be apparent from the foregoing that if the only control voltages applied to the control inverter are those provided by the oscillator 2, each control inverter would be actuated each cycle of the oscillator 2.

If an interlocking potential is applied to the common connection 69 or 73 which is associated with the conducting one of the transistors to maintain the potential of this connection sufficiently positive, it will maintain the charge on the associated capacitor sufficiently high so that any lowering of the potential of the terminal 40 by the oscillator 2 will not reduce the potential of the common point or connection sufficiently to divert the base drive current from the conducting transistor. Therefore, if suitable control voltages are applied to the common connections of the conducting transistors, except the transistor which should be rendered non-conducting, only one of the control inverters 4, 6 and 8 will be actuated each cycle of the oscillator 12.

This result is accomplished by the illustrated connections in which the output terminals 84 and 86 of the control inverter which is next to be actuated are connected to the control potential input terminals 88 and 90 of the inverter which has just been actuated. As illustrated, the inverters 4, 6 and 8 are arranged to provide alternating potential phase voltages in the order mentioned and the control potential input terminals 88 and 90 of inverter 4 are connected to the control potential output terminals 84 and 86 of the inverter 6 by conductors 42 and 48. The control potential input terminals 88 and 90 of the control inverter 6 are connected to the control potential output terminals 84 and 86 of the control inverter 8 by the conductors 50 and 52. The control potential input terminals 88 and 90 of the inverter 8 are connected to the control potential output terminals 84 and 86 of the control inverter 4 by the conductors 44 and 46. With this arrangement, each negative pulse supplied by the oscillator 2 actuates solely one of the control inverters 4, 6 and 8 to reverse solely the polarity of the output potential of its transformer 54 at any one oscillation and in a sequence such that square waves of output voltages provided by these control inverters are 120 electrical degrees displaced from each other.

The power inverting network 16 is driven at three times the frequency of the output voltages of the control inverters 4, 6 and 8 which are driven at the output frequency of the lines L1, L2, L3 and N1. In order to provide a control potential for driving the power inverting network 16, secondary windings 92 and 94 are provided on each of the transformers 54. All of the windings 92 are connected in additive series between a common conductor 96 and a conductor 98 which are connected to the input terminals 100 and 102 respectively of the cycle dividing mechanism 20. Similarly, all of the windings 94 are connected in additive series between the common conductor 96 and a conductor 104. The conductor 104 is connected to the third control voltage input terminal 106 of the dividing mechanism 20. The polarity of the series circuit derived from the windings 92 is 180 degrees out of phase with that derived from the windings 94. Since the voltages generated in the transformers 54 are square wave voltages the voltages generated between the conductors 96–98 and 96–104 will have a third harmonic frequency whereby the cycle dividing mechanism 20 will be driven at three times the frequency of the output voltages of the control inverters 4, 6 and 8.

Each time that the input terminal 102 is rendered positive with respect to the terminals 100 and 106, a pulse is provided between the dividing mechanism output terminals 108 and 110 which are connected to the input terminals 112 and 114 of the power inverting network 16. This pulse is applied between the gate and cathode of a control valve 116 to cause it to conduct and initiate a first half cycle of the inverter 16. Similarly, when the terminal 106 is rendered positive with respect to the terminals 100 and 102, a pulse is applied between the output terminals 118 and 120 which are connected to input terminals 122 and 124 of network 16. This pulse is spaced 180° from the pulse applied to the terminals 112 and 114 and renders the control valve 126 conducting to initiate the second half cycle of the inverter 16.

The cycle dividing mechanism 20 comprises two saturating core type transformers 198 and 200 which may be mag-amps, and a relaying device 202. The transformer 198 is provided with a primary winding 204, the dotted terminal being connected to the input terminal 102 and the undotted terminal being connected through a diode 206, resistor 226 and a diode 228 to terminal 106. A conductor 208 connects the common terminal 227 of the diode 206 and resistor 226 to the base of a transistor 212 through a resistor 210. The emitter of this transistor 212 is connected to the input terminal 100 by means of a conductor 214. Similarly, the transformer 200 is provided with a primary winding 216, the dotted terminal being connected to the input terminal 106 and the undotted terminal being connected through a diode 218, a resistor 254 and diode 256 to the terminal 102. A conductor 220 connects the common terminal 255 of the diodes 218 and resistor 254 to the base of a transistor 224 through a resistor 222. The emitter of this transistor 224 is connected to the conductor 214 and thereby to the input terminal 100.

The transformer 198 is provided with a plurality of secondary windings S1, S2, S3, S4, S5, S6 and S7. Similarly, the transformer 200 is provided with secondary windings S8, S9, S10, S11, S12, S13 and S14. The windings S7 and S8 are connected to provide the control pulses to the output terminals 108–110 and 118–120 for initiating the half cycles of the power inverter 16.

The relaying device 202 controls the energization of a switching transformer 230 which terminates the conductive periods of the valves 116 and 126 and actuates the control transistors 266, 268 and 270 of the shunting switches 272, 274 and 276. The potential for energizing the primary winding 232 of transformer 230 is derived from a source of unidirectional potential (not shown) connected between two terminals 233 and 234. The terminal 234 is connected by a conductor 235 to the center tap of primary winding 232. The lower and upper end terminals of winding 232 are connected by conductors 236 and 237 to the collectors of the transistors 212 and 224. The conductor 214, which is connected to the emitters of the transistors 212 and 224, is connected to the negative terminal 233.

For the purpose of rendering the discontinuous control type valves 116 and 126 (which may take the form of controlled rectifiers) non-conducting, transistors 242 and 244 are provided. These transistors have their collectors connected to a common bus 250 to which the anodes of the valves 116 and 126 are also connected. The emitter of transistor 244 is connected to a tap 246 of the center tapped primary winding 248 which is between its center tap connection (connected to the negative terminal of the power supply) and the end tap to which the cathode of the valve 116 is connected. Likewise the emitter of transistor 242 is connected to a tap 258 which is between the center tap and the end tap to which the cathode of the valve 126 is connected. The conductivity of the transistors 244 and 242 is controlled by the secondary windings 238 and 240 respectively of the transformer 230. These windings are connected in opposite polarity between the bases and emitters of these transistors so that when the transistor 212 conducts the transistor 244 will conduct to extinguish the valve 116 and when transistors 224 conducts the transistor 242 conducts to extinguish the valve 126.

Upon initial positive energization of the input terminal 102 with respect to the terminals 100 and 106 current flows from the diode 206 through the resistor 226 and diode 228 to the terminal 106. Prior to saturation of the core of the transformer 198, the secondary windings S1, S2, S3, S4, S5, S6 and S7 will be energized. The magnitude of the resistance of resistor 226 is so chosen relative to the potential existing between the terminals 102–100–106 and to the magnitude of the current flowing through winding 204, that a current will flow from terminal 100 through conductor 214, the diode 400 and conductor 208 into terminal 227. The current flowing from terminal 227 through resistor 226 and diode 228 into terminal 106 is the sum of the two aforementioned currents. Since diode 400 is conducting its drop is applied to the base-emitter circuit of transistor 212 making the emitter positive with respect to the base and thereby keeping transistor 212 non-conducting.

When the transformer 198 saturates no further voltage will be induced in the secondary windings S1, S2, S3, S4, S5, S6 and S7 and the potential of the common connection 227 will be substantially that of the input terminal 102. This causes sufficient current to flow through conductor 208, resistor 210, base to emitter of the transistor 212 and conductor 214 back to the terminal 100 to drive the transistor 212 into a conducting condition. This energizes the lower half of the primary winding 232 of the switching transformer 230 in a direction to make the dotted terminals of the secondary windings 238 and 240 positive. The secondary winding 240 is of incorrect phase to render the transistor 242 conducting however, the winding 238 is effective to render the transistor 244 conducting. As explained above, the controlled rectifier 116 was rendered conducting when the terminal 102 was initially made positive so that when the conducting pulse is supplied from the transformer 230 to render the transistor 244 conducting, it reduces the current flow through the rectifier 116 below its sustaining value and the controlled rectifier thereupon becomes non-conducting. In like manner the primary winding of the transformer 232 will be energized in the opposite polarity as a consequence of the saturation of the transformer 200 and the rendering of the transistor 224 conducting to fire the transistor 242 and extinguish the controlled rectifier 126 at the termination of the pulse time in the opposite half cycle of the power inverter 16.

The power inverting network 16 includes a plurality of switching means 142, 144 and 146 for connecting and disconnecting the end terminals 136 and 138 of the secondary windings 128, 139 and 132 of the transformer 134 to the line conductors L10, L20 and L30. The neutral conductor N10 is directly connected to the intermediate tap 140 of the windings 128, 139 and 132.

The switch means comprise identical A and B sections each of which comprises a rectifier bridge with a transistor 172, in the case of sections A, and 176, in the case of sections B, which when conductive permits current of either polarity to flow through the respective sections. It will be appreciated that the shown switch means are illustrative and any other type of switch which conducts in both directions and which may be rendered conducting and non-conducting rapidly may be used.

The transformer 230 is provided with additional secondary windings 260, 262 and 264. The output of these windings is rectified and applied base to emitter of the control transistors 266, 268 and 270 of the power inverter switches 272, 274 and 276. These switches are individually connected between the center tap connections of the secondary windings 128, 130 and 132 and the output line L10, L20 and L30. The center tap connections are all connected to the neutral bus N10. Since, as will be explained below, the switches 142, 144 and 146 will be open or non-conductive whenever the switches 272, 274 and 276 are closed, the closure of the shorting switches will short together the output lines L10, L20, L30 and N10 without shorting the secondary windings 128, 130 and 132. The effect of shorting the output lines is to permit reactive current in the load circuit to flow unimpeded by any reactance in the power transformer 134. The effect of opening the output circuits of the windings 128, 130 and 132 is to reduce current flow in the primary winding 248 to the magnetizing and loss current of the transformer 134. With the arrangement, the transistors 242 and 244 will be required to conduct current of a magnitude much less than that which flows through the valves 116 and 126 so that much smaller transistors may be used than would be required if they were required to interrupt load current.

As set out above the power inverter operates at three times the output frequency of the potential supplied to the output buses L10, L20, L30 and N10. This means that the power inverter 16 provides a positive, negative and a positive half cycle for each positive half cycle and a negative, a positive and a negative half cycle for each negative half cycle of the output voltage of the apparatus 1.

By properly controlling the switches 142, 144 and 146 half cycles of the desired polarity may be supplied to the buses. For example during the initial portion of the output voltage positive half cycle the switch section A is rendered conducting (at 0 degrees) to provide the positive pulse $E_{A1}$, $E_{B1}$ or $E_{C1}$ as the case may be. This lasts for a duration of not over 60 electrical degrees based on the output voltage cycle. At 60 degrees, when the power inverter 16 reverses the polarity of its output potential, switch section B is closed to provide a second positive pulse $E_{A2}$, $E_{B2}$ or $E_{C2}$ as the case may be. Again this switch section B remains closed for not over 60 degrees. At 120 degrees when the power inverter 16 again reverses the polarity of its output, the switch section A is again closed to provide the third and final portion of the positive pulse $E_{A3}$, $E_{B3}$, or $E_{C3}$ as the case may be. The negative half cycle of the output voltages $E_A$, $E_B$ and $E_C$ are similarly formed by controlling the switches 142, 144 and 146. In this regard it should be noted that the switch sections A are fired twice in sequence to provide the successive positive and negative pulses $E_{A3}$ and $E_{A4}$ at the end of a positive output half cycle of the potential $E_A$ supplied to line L10 and to provide the successive negative and positive pulses $E_{A6}$ and $E_{A1}$ at the end of a negative output half cycle. The switches 144 and 146 are similarly controlled to provide the voltages $E_B$ and $E_C$.

As will be apparent from the drawings, the intermediate tap 140 is not located half-way between the end taps 136 and 138 but is located closer to the end tap 138. Preferably, this distance is such that the voltage generated between the taps 138 and 140 is one-half that generated between the taps 136 and 140. This relationship eliminates the third harmonics but if the elimination is not critical and if a square wave output is desired rather than a shaped output wave the intermediate tap 140 could be located such that the voltage between this tap and either of the end taps 136 and 138 is the same.

The switching means 142, 144 and 146 are operated such that the A and B portions thereof are effective to supply a positive pulse to the output lines L10, L20 and L30 for three half cycles of the voltage supplied by the power transformer 134 and thereafter to supply pulses of negative polarity to these lines. Control pulses of the operating frequency of the power inverter 16 but of a polarity reversing at the output frequency of the lines L10, L20 and L30 and N10 are provided by the phase reversers 10, 12 and 14. These reversers are energized from the control inverters 4, 6 and 8.

Each of the phase reversers 10, 12 and 14 is made up of a C section comprising a flip-flop circuit and a D section comprising a flip-flop circuit. These sections are of identical construction but are energized by potentials phase shifted by 180 degrees with respect to each other.

Each of the sections are provided with three potential input terminals 148, 150, and 152 which are energized respectively from the end and center terminals of the center tapped secondary windings of the transformer 54 associated with the one of the control inverters 4, 6 and 8 with which the particular phase reverser is associated. Terminal 148 is connected through a diode 158, collector to emitter of a transistor 160, a common emitter bus 162, a biasing resistor 164 and a diode 149 to the input terminal 150. Similarly, the terminal 150 is connected through a diode 166, collector to emitter of a transistor 168, the common emitter bus 162, the biasing resistor 164 and diode 151 to the terminal 148. The terminals 148 and 150 of the C sections are connected respectively to the dotted and undotted end taps of the secondary winding 326 of the transformer 54 and terminals 148 and 150 of the D sections are connected respectively to the undotted and dotted end taps of the secondary winding 328 of the transformer 54 of the control inverter with which they are associated. With such an arrangement the transistor 160 of section C and the transistor 168 of section D are capable of conducting during one-half cycle of the transformer 54 and during the opposite half cycle the transistor 168 of section C and 160 of section D are capable of conducting.

In order that the section C of the phase reverser 14 may control the conductivity of the A section of the switching means 146, the terminal 152 thereof is connected by a conductor 170 to the emitter of the transistor 172 which controls the open and closed condition of the switch section A of switch 146. A conductor 174 which connects with a second portion of the resistor 164 connects to the base of the same transistor 172. It will therefore be appreciated that when either the transistor 168 or transistor 160 of section C of reverser 14 conducts, a potential is established which will provide base drive current for the transistor 172 of switch 146. The switch 146 then becomes conductive to connect the tap 138 of the winding 132 to the output line L30. Similarly the conductors 178 and 180 connect a portion of the resistor 164 of the D sections of reverser 14 in series with emitter and base of the transistor 176 of the B section of the switch 146. With this arrangement A and B sections of switch 146 will be rendered conductive by the transistors 168 of section C and 160 of section D at one-half cycle of the output voltages $E_4$, $E_6$ or $E_8$ associated control inverter and by transistor 160 of section C and transistor 168 of section D at the other half cycle of the control inverter. Similarly the emitters and bases of the corresponding transistors 172 and 176 of the switches 144 and 142 are connected by means of conductors 182–184; 186–188; 190–192; and 194–196 across the biasing resistors 164 of the C and D sections of the phase reversers 12 and 10 respectively.

The bases and emitters of the transistors 160 are individually connected across the secondary windings S1–S6 while those of the transistors 168 are individually connected across the secondary windings S9–S14. Since the transistors 160 of the C sections conduct on opposite half cycles to the transistors 160 of D sections, only the transistors 160 of the sections C and D may be conductive at one-half cycle of the output voltages of the transformers 54 and then only at the half cycle of the potential applied to the terminal 100, 102 and 106 at which the transformer 198 is energized. For similar reasons the transistors 168 of the sections D and C may be conductive during this same half cycle of the potential of the transformers 54 but at the opposite half cycle of the potential at the terminals 100, 102 and 106. During the other half cycle of the output voltages of the transformers 54 the transistors 160 of the D and C sections and transistors 168 of the C and D sections may conduct at opposite half cycles of the voltage at terminals 100, 102 and 106.

During the time before the transformer 198 saturates ($t_0$–$t_1$) and voltage $E_8$ is positive, the biasing resistor 164 of section C of reverser 14 will be energized as a consequence of the conduction of transistor 160 of this section C to render the transistor 172 conductive. Similarly during this time the transistor 160 of section C of reverser 12 is conductive to cause section A of switch 144 to conduct. However, since voltage $E_4$ is negative at this time the transistor 160 of section D of switch 146 will be conductive and section B of switch 142 will be conductive.

In order to control the periods during which the controlled rectifiers 116 and 126 are conductive to supply energy from the power input into the power transformer 134, a feedback signal generator 22 is connected to be energized by the output conductors L1, L2, L3 and N1. This feedback generator comprises a bridge network 284 having input terminals 286 and 288 and output terminals 290 and 292. Resistors 294 and 296 are respectively interconnected between the sets of terminals 286–292 and 288–290. Zener diodes 298 and 300 are respectively connected between the sets of terminals 286–290 and 292–288. Diodes 302, 304, 306 respectively connect the line L1, L2 and L3 to a common bus 308 which is connected through a fixed resistor 310 and an adjustable resistor 312 to the input terminal 286. The other terminal 288 is connected by conductor 314 to the neutral line N10. A capacitor 316 is connected between the common point of the resistors 310 and 312 and the neutral conductor N10 in shunt with the bridge network 284 to maintain the potential across this network more stable. The output terminal 290 is connected by means of conductor 318 through the control windings 320 and 322 of the transformers 198 and 200, respectively and conductor 323 and current limiting resistor 324 to the other output terminal 292.

It is believed that the remaining details of construction may best be understood by a description of operation of the three phase inverter 1 which is as follows: Upon energization of the oscillator 2 the oscillator oscillates to provide alternating current signals between the buses 36 and 38. During the half cycles in which the bus 36 goes negative with respect to the bus 38 solely one of the control inverters 4, 6 and 8 will be actuated to reverse the output voltage supplied by its output transformers 54.

The output signals which are supplied from the control inverter 4 to control the inverter 8, from the control inverter 6 to control the inverter 4 and from the control inverter 8 to control the inverter 6 are such that the control inverters 4, 6 and 8 are sequenced in that order in response to successive pulses from the oscillator 2 to provide square wave output voltages at the transformers 54 phase shifted from each other 120 electrical degrees.

The cycle dividing mechanism 20, which is energized from the control inverters 4, 6 and 8, is operated at three times the frequency of the output voltage of the control inverters and at the same frequency as the power inverter. It remains at all times in step with the output voltages of the secondary windings 128, 130 and 132 as represented by the curves $E_4$, $E_6$ and $E_8$. Curve $f_2$ represents the voltage between terminals 100 and 106.

Assuming a time $t_0$ at which the transformer 54 of the control inverter 8 has just been actuated so that the dotted terminals thereof are positive with respect to the undotted terminals, the cycle dividing mechanism 20 will have just been actuated so that its input terminal 102 is positive with respect to its input terminal 106 as indicated by the curve $f_2$. During this initial interval and prior to saturation of the core of the transformer 198, voltage will be induced in the windings S1–S7 in a polarity in which the dotted terminals thereof are positive. This biases the transistors 160 into a conducting condition. At this same time the windings 328 and 326 of the transformers 54 are energized to provide a conducting polarity of voltage solely to the transistors 160 in the C sections of the reversers 12 and 14 and a conducting voltage to the transistor 160 of the D section of the reverser 10. This results in the transistors 160 of the C sections of reversers 12 and 14 and the D section of the reverser 10 being rendered conducting to supply a drive current $A_{2C}$, $B_{1C}$, and $C_{1C}$ whereby drive current is supplied to turn on the transistors 172 of the A sections of the switch means 144 and 146 and the B section of the switch means 142 so that the dotted terminals of the windings 130 and 132 and undotted terminal of the winding 128 are respectively connected to the output buses L10, L20 and L30 to provide the voltages $E_{A5}$, $E_{B3}$ and $E_{C1}$.

This condition continues until the core of the transformer 198 saturates (time $t_1$) at which time the drive current to the transistors in the phase reversers 10, 12 and 14 is terminated. The biasing resistors 164 thereof become deenergized thereby removing the drive current from the switches 142, 144 and 146. This opens the switches and disconnects the windings 128, 130 and 132 from the output lines L10, L20, L30.

At the time the transformer 198 saturated, the transistor 212 began to conduct and energize the lower half of the primary winding 232 of the control transformer 230. The secondary windings 260, 262, and 264 which are then energized render the transistors 266, 268 and 270 conductive to close the switches 272, 274 and 276 and short circuit the conductors L10, L20 and L30 and N10 to disconnect the power transformer 134 from the load. At the same time the energized secondary winding 238 renders the transistor 244 conducting. This reduces the current flow through the controlled rectifier 116 below its sustaining value and this rectifier becomes non-conducting. Since all of the secondary windings of the transformer 134 are open circuited, the winding 248 is energized solely with magnetizing current and transformer loss current. The pulse $D_1$ provided by the cycle dividing mechanism 20 initiated this sequence.

At the time $t_2$ the oscillator voltage $f_1$ again goes negative. At this time the control inverter 6 is actuated to reverse the output potential of its transformer 54 to its opposite or negative half cycle in which the dotted terminals of its transformer 54 are negative with respect to its undotted terminals. The phase reverser 12 associated therewith is thereupon placed in a condition in which the transistor 168 of its C section and the transistor 160 of its D section will have potential of the proper polarity applied thereacross to conduct as soon as drive current is supplied. The corresponding transistors 160 of the C section and 168 of the D section will not have this proper conducting polarity potential.

At the time the inverter 6 reversed, the terminal 106 became positive with respect to the terminals 100 and 102 thereby terminating further conduction of the transistor 212 and further energization of the switching transformer 230 to open the switches 272, 274 and 276 and render transistor 244 non-conducting. Current then flows through the primary winding 216 of the transformer 200 energizing the secondary windings S8–S14. The energization of the winding S8 places a conducting pulse on the controlled rectifier 126 which thereupon begins to conduct to energize the power transformer in the opposite polarity so that the dotted terminals of the windings 128, 130 and 132 then become negative with respect to the undotted terminals.

Energization of the windings S9–S14 places these windings in condition to supply drive current to the transistors 168 of the phase reversers 10, 12 and 14. As indicated by the curves $E_4$, $E_6$ and $E_8$ the transistors 160 of sections 10C, 12C and 14D will be conductive to supply drive current to the transistor 172 of switch means 142, transistor 172 of switch means 144 and transistor 176 of switch means 146. This provides the negative energizing potentials $E_{A6}$ and $E_{B4}$ on lines L10 and L20 and a positive energizing potential $E_{C2}$ on line L30 as indicated on the curves $E_A$, $E_B$ and $E_C$. This operation will continue until the time $t_3$ at which time the core of the transformer 200 saturates. The secondary windings S8–S14 become deenergized, the impedance of the primary winding 216 substantially disappears and terminal 255 substantially assumes the potential of the terminal 106. This, as above described in connection with the saturation of transformer 198 and the terminal 227 provides a drive current to the transistor 224 which thereupon conducts to energize the upper half of the primary winding 232 of the switching transformer 230. The secondary windings 260, 262 and 264 are again energized and close the switches 272, 274 and 276 in the manner described above. In this case the polarity of energization of the switching transformer 230 is opposite to that when the transistor 212 conducted and the energized secondary winding 240 provides drive current for the transistor 242 which thereupon conducts to extinguish the controlled rectifier 126. Deenergization of the secondary windings also removed the drive current from the transistors 160 of the phase reversers 10, 12 and 14 to open the switches 142, 144 and 146 whereby the secondary windings 128, 130 and 132 are disconnected from the output conductors L10, L20 and L30.

This operating condition continues until the time $t_4$ at which time the oscillator will provide a subsequent negative pulse. As indicated this actuates the control inverter 4 whereby the polarity of the potential of its output transformer 54 will reverse and the dotted terminals thereof become positive with respect to the undotted terminals. The sections D and E of the phase reverser 10 associated therewith are thus energized to supply the proper polarity of potential to permit conduction of the transistors 160 of the C sections of reverses 10 and 14 and of the D section of reverse 12. This connects the power transformer 134 to the lines L10, L20 and L30 to provide the voltage pulses $E_{A1}$, $E_{B5}$ and $E_{C3}$ thereto as indicated by the curves $E_A$, $E_B$ and $E_C$.

It is believed that the remainder of the cycle of operation of the inverter 1 will be understood by a reference to the curves of FIG. 3.

The voltage supplied to the lines L10, L20 and L30 is supplied to the lines L1, L2 and L3 through filters 278, 280 and 282 respectively. The magnitude of the voltage of the lines L1, L2 and L3 with respect to the neutral line N1 is controlled by the magnitude of the, and the direction of the, current passing through the bridge network 284. The control current at the output terminals 290 and 292 is supplied to 320 and 322 in a magnitude and direction to reset the flux in the cores of the transformers 198 and 200 each time the cores are brought to saturation to thereby determine the time required for the cores of these transformers to saturate, as set forth above, and control the pulse time during which the power input supply supplies energy to the lines L10, L20 and L30 and thereby the output voltage of the inverter 1.

The transformers 198 and 200 are provided with additional windings 336 and 338 which are energized from the same control voltage which energizes the primary winding 232 of the transformer 230 by means of conductors 340 and 214 and the fixed and adjustable resistors 344 and 346. This is connected in the usual manner to provide means for a proportional bias signal thereby reducing the amount of closed-loop gain necessary to achieve a given output voltage tolerance. Voltage adjustment is provided by adjustable resistor 312.

Although the invention has been described with reference to a certain specific embodiment, numerous modifications are possible and it is desired to cover all modifications falling within the spirit and scope of the invention.

What is claimed and is desired to be secured by United States Letters Patent is as follows:

1. In an inverter, a pair of power input terminals, high frequency power output terminals, low frequency power output terminals, first and second electric valves, a first power path connecting said pair of input terminals to said high frequency output terminals for energizing said high frequency output terminals in a first polarity and including said first valve, a second power path connecting said pair of input terminals to said high frequency output terminals for energizing said high frequency output terminals in a second polarity and including said second valve, first and second switches, a third power path connecting two of said high frequency terminals to two of said output terminals and including said first switch, a fourth power path connecting a pair of said high frequency terminals to a pair of said output terminals and including said second switch, first control means operatively connected to said valves for alternately rendering said valves conductive at a first frequency, second control means operatively connected to said switches for alternately rendering said switches conductive at said first frequency, and third control means operatively connected to said second control means for altering the sequence of operation of said switches at a second frequency, said second frequency being less than and a predetermined proportion of said first frequency.

2. The combination of claim 1 in which the ratio of said first frequency to said second frequency is an integer.

3. The combination of claim 1 in which said first frequency is three times said second frequency and in which the potential supplied to said low frequency output terminal by said third path is less than the potential supplied by said fourth path and in which said third control means alters said sequence of said second control means following a rendering of said fourth path conductive.

4. The combination of claim 3 in which the potential supplied by said third path is twice the potential supplied by said fourth path.

5. A network for transforming unidirectional potential electrical energy into alternating potential electrical energy comprising, a transformer having primary winding means and second winding means, a pair of input terminals, first and second electrical valves, a first power path connecting said primary winding means to said input terminals for energization of said secondary winding means in a first polarity and including said first valve, a second power path connecting said primary winding means to said input terminals for energization of said secondary winding means in a second polarity and including said second valve, control means operatively connected to said valves and alternately rendering said valves conductive at a first frequency, first and second switches, a pair of output terminals, a third power path connecting a first portion of said secondary winding means to said output terminals and including said first switch, a fourth power path connecting a second portion of said secondary winding means to said output terminals and including said second switch, control means operatively connected to said swtiches for closing said switches in predetermined sequence at said first frequency, and means for actuating said control network for interrupting said sequence at a second frequency which is less than said first frequency.

6. A network for transforming unidirectional potential electrical energy into alternating potential electrical energy comprising, a transformer having primary winding means and secondary winding means, a pair of input terminals, first and second electrical valves, a first power path connecting said primary winding means to said input terminals for energization of said secondary winding means in a first polarity and including said first valve, a second power path connecting said primary winding means to said input terminals for energization of said secondary winding means in a second polarity and including said second valve, control means operatively connected to said valves and alternately rendering said valves conductive at a first frequency, timing control means operatively connected to said valve for rendering each said valve nonconductive a predetermined time interval subsequent to the rendering of the respective said valve conductive, first and second and third switches, a pair of output terminals, a third power path connecting a first portion of said secondary winding means to said output terminals and including said first switch, a fourth power path connecting a second portion of said secondary winding means to said output terminals and including said second switch, control means operatively connected to said switches for closing said switches in predetermined sequence at said first frequency, means for actuating said control network for interrupting said sequence at a second frequency which is less than said first frequency, means connecting said third switch to shunt said output terminals, and means operatively connecting said third switch to one of said control means for rendering said third switch conductive concurrently with the rendition of each said valve nonconductive.

7. In combination, a first transformer having a primary winding with end taps and a center tap and a tap intermediate said center tap and each of said end taps, said transformer having at least one secondary winding with end taps and an intermediate tap, first and second discontinuous control type valves, third and fourth continuous control type valves, each said valve having a main circuit and a control circuit, a pair of power input terminals, means connecting said primary center tap to one of said input terminals, means connecting one of said end taps of said primary winding to the other of said input terminals and including said main circuit of said first valve, means connecting said other terminal to the one of said intermediate taps which is intermediate said primary winding one end tap and said primary winding center tap and including said main circuit of said third valve, means connecting said other terminal to the other of said end taps of said primary winding and including said main circuit of said second valve, means connecting said other terminal to the other of said intermediate taps which is intermediate said primary winding one end tap and said primary winding center tap and including said main circuit of said fourth valve, an output terminal, a first switch connecting one of said end taps of said secondary winding to said output terminal, a second switch connecting the other of said end taps of said first transformer secondary winding to said output terminal, a timing device providing first and second time periods in alternating sequence, said timing device including means to divide each said time period into sequentially arranged first and second time intervals, means operatively connecting said timing device to said first and second switches for rendering said first switch conductive during said first time interval of said first time period and for rendering said second switch conductive during said first time interval of said second time period, a third switch connecting said intermediate tap of said secondary winding to said output terminal, means connecting said timing device to said control circuits of said first and second valves for rendering said main circuit of said first valve conductive during said first time interval of one of said time periods and for rendering said main circuit of said second valve conductive during said first time interval of the other of said time periods, means connecting said timing device to said control circuits of said third and fourth valves for rendering said main circuit of said third valve conductive during said second time interval of said one time period and for rendering said main circuit of said fourth valve conductive during said second time interval of said other time period, and means connecting said timing device to said third switch to render said third switch conductive during each of said second time intervals.

8. In combination, means providing first and second sources of alternating control potential alternating at first and second frequencies respectively, said first frequency being three times that of said second frequency, a controlling network energized by said sources and having first and second output circuits which are alternately energized at said first frequency and in fixed relationship to the half cycles of said first source, third and fourth sources of power potential alternating at said first frequency and in predetermined phase relation therewith, said third and fourth sources being phase displaced from each other and of unequal magnitude, a pair of power output terminals, first and second power flow controlling devices, a first power circuit connecting said third source to said output terminals for flow of power therebetween and including said first power flow device, a second power circuit connecting said fourth source to said output terminals and including said second power flow device, means connecting said first power flow device to said first output circuit and said second power flow device to said second output circuit, said power flow devices being rendered effective to cause the said power circuit with which they are associated to become alternately conductive at said first frequency in accordance with the alternate energization of said output circuits, said network being operable in response to said second frequency to reverse said relationship each half cycle of said second source.

9. The combination of claim 8 in which the magnitude of the output voltages of the third and fourth sources has the ratio of one to two and said phase relation of said first and second frequencies is provided for energizing said first power circuit twice and said second power circuit once each half cycle of said second frequency.

10. The combination of claim 9 in which said first source of alternating potential has pulses of less than 180 degrees duration, there is provided a third power flow controlling device, a shorting network connected between said output terminals and including said third power flow device, means connecting said third power flow device to said first source of potential for rendering said third power flow device effective to cause said shorting network to short said output terminals solely during and for a period not exceeding the number of degrees by which each pulse thereof is less than 180 degrees.

11. The combination of claim 10 in which said third and fourth sources are first and second winding portions of a secondary winding of a transformer having a primary winding energized by means of a pair of alternately conducting power transfer networks, each said transfer network comprising a discontinuous control device and a continuous control device whereby it is connected to and disconnected from first and second portions of said primary winding respectively, said second portion comprising a lesser number of winding turns than said first portion, means energized connected to and energized by said first source for alternately rendering said discontinuous control devices conducting whereby said power transfer networks are effective to transfer power to said transformer in a first phase relationship to the output voltage of said first source, means connected to and energized by said first source for alternately rendering said continuous control devices conductive in alternating relationship to the rendering conductive of said discontinuous control devices whereby said power transfer networks are effective to conduct power pulses, said last-named means having a lagging phase relationship to the output voltage of said first source, said means which connects said third power flow device to said first source being effective to render said shorting network effective at said lagging phase relationship.

12. The combination of claim 11 in which said first phase relationship at which said power transfer networks are energized is in phase with the voltage of said first source and said lagging phase relationship at which said power transfer networks are energized lags the phase of the output voltage of said first source by a number of degrees equal 180 minus the number of degrees that each pulse of said first source is less than 180 degrees.

13. In combination, means providing first and second sources of alternating potential alternating at first and second frequencies respectively, said first frequency being three times that of said second frequency, a controlling network energized by said sources and having first and second output circuits which are alternately energized at first frequency and in fixed relationship to the half cycles of said first source, said network being operable in response to said second frequency to reverse said relationship each half cycle of said second source, a pair of switching means, each said switch means having a main circuit and a control circuit for controlling its said main circuit, a transformer having a secondary winding, said winding having end terminals and an intermediate terminal providing first and second winding portions, said second winding portion having an output voltage equal to twice that of said first winding portion, means energizing said transformer from a third source of alternating potential power alternating at said first frequency, a pair of power output terminals, first means connecting said first winding portion to said power output terminals and including a first of said switch means, second means connecting said second winding portion to said power output terminals and including the second of said switch means, means connectng said controlling network first output circuit to said control circuit of said first switch means, and means connecting said controlling network second output circuit to said control circuit of said second switch means.

14. In combination, a first transformer having primary winding means and secondary winding means, first circuit means connected to and arranged to supply a first alternating potential of a first frequency to said primary winding means, first and second switching networks, each said network including potential input connections and potential output connections and first and second asymmetrically conducting circuits interconnecting its said input and output connections, each said asymmetrically conducting circuit including an electric valve having a main circuit for controlling the energization of its said output connections with which it is associated, each said electric valve including a control circuit for controlling its respective said main circuit, second circuit means connected to and arranged to supply a second alternating potential of a second frequency to said control circuits of said electric valves, said second circuit means being polarized so as to render conductive said electric valves of said first asymmetric circuits during a first half cycle of said second potential and to render conductive said electric valves of said second asymmetric circuits during the second half cycle of said second potential, said first circuit means being polarized to provide for conduction through said first asymmetric circuits during one half cycle of said first potential and to provide for conduction through said second asymmetric circuits during the other half cycle of said first potential.

15. In combination, a first transformer having primary winding means and secondary winding means, first circuit means connected to and arranged to supply a first alternating potential of a first frequency to said primary winding means, first and second switching networks, each said network including potential input connections and potential output connections and first and second asymmetrically conducting circuits interconnecting its said input and output connections, each said asymmetrically conducting circuit including an electric valve having a main circuit for controlling the energization of the said output connection with which it is associated, each said electric valve including a control circuit for controlling its respective said main circuit, second circuit means connected to and arranged to supply a second alternating protential of a second frequency to said control circuits of said electric valves, said second circuit means being polarized so as to render conductive said electric valves of said first asymmetric circuits during a first half cycle of said second potential and to render conductive said electric valves of said second asymmetric circuits during the second half cycle of said second potential, said first circuit means being polarized to provide for conduction through said first asymmetric circuits during one half cycle of said first potential and to provide for conduction through said second asymmetric circuits during the other half cycle of said first potential, a pair of switch means, each said switch means having a main circuit and a control circuit for controlling its said main circuit, a third source of alternating potential of said second frequency, a pair of power output terminals, first means connecting said third source to said power output terminals and including a first of said switch means, second means connecting said third source to said power output terminals and including the second of said switch means, means connecting said potential output connections of said first switching network to said control circuit of said first switch means, and means connecting said potential output connections of said second switching network to said control circuit of said second switch means, said two last-named connecting means being polarized to cause said switch means to conduct at opposite half cycles of said third potential.

16. In combination, a first transformer having primary winding means and secondary winding means, first circuit means connected to and arranged to supply a first alternating potential of a first frequency to said primary winding means, first and second switching networks, each said network including potential input connections and potential output connections and first and second asymmetrically conducting circuits interconnecting its said input and output connections, each said asymmetrically conducting circuit including an electric valve having a main circuit for controlling the energization of its said output connections with which it is associated, each said electric valve including a control circuit for controlling its respective said main circuit, second circuit means connected to and arranged to supply a second alternating potential of a second frequency to said control circuits of said electric valves, said second circuit means being polarized so as to render conductive said electric valves of said first asymmetric circuits during a first half cycle of said second potential and to render conductive said electric valves of said second asymmetric circuits during the second half cycle of said second potential, said first circuit means being polarized to provide for conduction through said first asymmetric circuits during one half cycle of said first potential and to provide for conduction through said second asymmetric circuits during the other half cycle of said first potential, a power transformer having a primary winding and a secondary winding having end taps and an intermediate tap, circuit means connected to and arranged to supply a third alternating potential of said second frequency to said primary winding of said power transformer, a pair of power output terminals, first and second and third switching means, each said switch means having a main circuit and a control circuit for controlling its said main circuit, means connecting a first of said end taps to a first of said power output terminals and including said main circuit of said first switching means, means connecting the other of said end taps to said first power output terminals and including said main circuit of said second switching means, means connecting said intermediate tap to said first power output terminals and including said main circuit of said third switching means, current conducting means connecting said intermediate tap to the second of said power output terminals, control means for regulating the portion of each half cycle of said third potential which is supplied to said primary winding of said power transformer and of said second potential which is supplied to said control circuits of said electric valves, said last-named control means being connected to said control circuit of said third switching means and effective to render conductive said main circuit of said third switching means during the portion of said half cycles of said second potential which are not supplied to said control circuits of said electric valves.

17. A three phase inverting apparatus comprising an oscillator having an alternating potential output, three inverting networks, each said network having a square wave voltage output, means interconnecting said networks with each other and with said oscillator to drive said networks with their output voltages in 120 degree phase relation, three phase-reversing networks, each said phase- reversing network comprising first and second switching sections, each said section including first and second asymmetric circuits and a pair of output terminals, circuit means individually connecting said three reversing networks for energization by said three inverting networks, said circuit means being arranged to energize each said first asymmetric circuit solely during the same corresponding first half cycle of the potential supplied thereto from the respective said inverting network which energizes such said first asymmetric circuit and being arranged to energize each said second asymmetric circuit solely during the same corresponding second half cycle of the potential suplied thereto from the respective said inverting network which energizes such said second asymmetric circuit, a cycle dividing mechanism having first output means energized during an initial portion of corresponding first half cycles of an alternating control potential applied thereto and second output means energized during an initial portion of corresponding opposite half cycles of the said alternating control potential, said dividing mechanism having third and forth output means energized during terminal portions of said first and said second half cycles respectively of the said alternating control potential, circuit means connected to supply an alternating potential to said dividing mechanism at a frequency which is a whole multiple of the frequency of said square wave output voltage, a power inverter, said power inverter having a pair of power input terminals and three pairs of power output terminals and three pairs of power paths, each said pair of paths individually connecting a said pair of power output terminals to said pair of input terminals and in such polarity that when a first pair of each of said pairs of power paths is conductive said pairs of power output terminals are energized in a first polarity and when the second of each of said pairs of power paths is conductive said pairs of power output terminals are energized in a second polarity, circuit means interconnecting said dividing means and said power paths such that said first paths are conductive solely during said initial portion of said first half cycles and said second power paths are conductive solely during said initial portion of said opposite half cycles of said control potential, three groups of switches, each said group including first and second switching means, three sets of phase terminals, means individually connecting said three pairs of power output terminals to said three sets of phase terminals and including said first switching means of said three groups, means including said second switching means of said three groups individually connecting together said phase terminals of said sets of phase terminals, circuit means connecting said pairs of output terminals of said first and second sections of a first of said phase reversing networks to said first switching means of a first of said groups of switches to provide for energization of the first said phase terminals to which said first group is connected in a first relative polarity when said output terminals of said first section of said first reversing network are in a first energized condition and to provide for energization of said first phase terminals in a second relative polarity when said output terminals of said second section of said first reversing network are in their first energized condition, means individually connecting said pairs of output terminals of the second and third of said phase reversing networks to said first switching means of the second and third of said groups of switches respectively in the manner described above in connection with the connecting of said first phase reversing networks to said first group of switches, circuit means for actuating each said second switching means in concert with the said first switching means with which it is associated such that when said associated said first switching means disconnects the associated said phase terminals from said associated said paths said associated said second switching means connects together said terminals of said associated set of phase terminals.

18. A three phase inverting apparatus comprising an oscillator having an alternating potential output, three inverting networks, each said network having a square wave voltage output, means interconnecting said networks with each other and with said oscillator to drive said networks with their output voltages in 120 degree phase relation, three phase-reversing networks, each said phase-reversing network comprising first and second switching sections, each said section including first and second transistors and first and second diodes and input terminals and a pair of output terminals, each said section further including means connecting said first transistor and said first diode in a first series circuit which interconnects said input terminals with said output terminals and means connecting said second transistor and said second diode in a second series circuit which interconnects said input terminals with said output terminals, said first circuit being arranged to conduct at one half cycle of a potential applied to said input terminals and said second circuit being arranged to conduct during the other half cycle of said potential applied to said input terminals, circuit means individually connecting said input terminals of said three reversing networks for energization by said output voltage of said three inverting networks, said circuit means being arranged to energize each said first series circuit solely during the same corresponding first half cycles of the said output voltage supplied thereto and being arranged to energize each said second series circuit solely during the same corresponding second half cycles of the said output voltage, a cycle dividing mechanism comprising a first and second transformer designed to saturate within its operating range, each said transformer having a primary winding and a plurality of secondary windings, circuit means energized by the output voltages of said inverting networks and connected to energize said primary windings, means connecting said secondary windings of said first transformer to said first transistor for rendering said first transistors conducting, means connecting said secondary windings of said second transformer to said second transistors and phased such that said second transformer renders said second transistors conductive at the opposite half cycle of the potential applied to said primary windings from the half cycle that said first transformer renders said first transistors conductive, a power inverter, said power inverter having a pair of power input terminals and three pairs of power output terminals and three pairs of power paths each said pair of paths individually connecting a said pair of power output terminals to said pair of input terminals and in such polarity that when a first pair of each of said pairs of power paths is conductive said pairs of power output terminals are energized in a first polarity and when the second of each of said pairs of power paths is conductive said pairs of power output terminals are energized in a second polarity, circuit means interconnecting said secondary windings of said transformer of said dividing means and said power paths such that said first paths are conductive solely during one of said half cycles and said second power paths are conductive solely during the other of said half cycles of the potential supplied to said transformers, three groups of switches, each said group including first and second switching means, three sets of phase terminals, means individually connecting said three pairs of power output terminals to said three sets af phase terminals, and including said first switching means of said three groups, means individually connecting together said phase terminals of said sets of phase terminals including said second switching means of said three grops, circuit means connecting said pairs of output terminals of said first and second sections of a first of said phase reversing networks to said first switching means of a first of said groups of switches to provide for energization of the first said phase terminals to which said first group is connected in a first relative polarity when said output terminals of said first section of said first reversing network are in a first energized condition and to provide for energization of said first phase terminals in a second relative polarity when said output terminals of said second section of said first reversing networks are in their first energized condition, means individually connecting said pairs of output terminals the second and third of said phase reversing networks to said first switching means of the second and third of said groups of switches respectively in the manner described above in connection with the connecting of said first phase reversing network to said first group of switches, circuit means for actuating each said second switching means in concert with the said first switching means with which it is associated such that when said associated said first switching means disconnects the associated said phase terminals from said associated said paths said associated said second switching means connects together said terminals of said associated set of phase terminals.

19. A three phase inverting apparatus comprising means providing three alternating polarity control voltages spaced 120 electrical degrees from each other, three phase-reversing networks, each said network comprising a first and a second section, each said section having an impedance device and first and second circuits for energizing said impedance device, each said circuit being effective to energize said impedance device solely in a first polarty and including a switch for determing the periods in which the respective said circuit of which it is a part is effective to energize said impedance device, said switches which are associated with said first circuits being said first switches and said switches which are associated with said second circuits being said second switches, mean individually connecting said spaced voltages to said three phase-reversing networks such that during a first half cycle of the said voltage which is supplied to each said network said first circuits are in condition to conduct and such that during the second half cycle of the said voltage said second circuits are in condition to conduct, a cycle dividing mechanism, said mechanism comprising first and second transformers having a core which saturates within the operating range of said transformers and having primary and secondary windings, a divider energizing circuit for energizing said primary windings with a harmonic voltage derived from said three control voltages and having a frequency three times that of said control voltage, each said valve having a control circuit, means connecting said control circuits of said first switches to said secondary windings of said first transformer and polarized to render said first switches conductive during half cycles of said harmonic voltage a first polarity, and connecting said control circuits of said second switches to said secondary windings of said second transformer and polarized to render said second switches conductive during half cycles of said harmonic voltage of a second polarity, a power inverter, said power inverter having a pair of power input terminals and a power transformer and a plurality of electric valves, each said valve having a main circuit and a control circuit, said power transformer having a primary winding with a center tap and end taps and two intermediate taps, one of said intermediate taps being located intermediate said center tap and one of said end taps, the other of said intermediate taps being located intermediate said center tap and the other of said end taps, means connecting one of said power input terminals to said center tap, means connecting said one end tap to the other of said power input terminals and including said main circuit of a first of said valves, means connecting said other end tap to said other power terminal and including said main circuit of a second of said valves, means connecting said one intermediate tap to said other power terminal and including said main circuit of a third of said valves, means connecting said other intermediate tap to said other power terminal and including said main circuit of a fourth of said valves, means individually connecting said control circuits of said first and second valves to said secondary windings of said first and second transformers respectively whereby said main circuits of said first and second valves are rendered conductive during alternate half cycles of said harmonic voltage, a third transformer, means responsive to the saturating of said first and second transformers to provide pulses of alternating polarity to energize said third transformer, means connecting said control circuits of said third and fourth valves to said third transformer and polarized to render said third and fourth valves alternately conductive as a consequence of the alternating energization of said third transformer by said pulses, said power transformer having first and second and third secondary windings, each said power transformer secondary winding having end taps and an intermediate tap, first and second and third pairs of power output terminals, means individually connecting said secondary winding intermediate taps to first terminals of said pairs of power output terminals, first and second and third pairs of power switching devices, means including first switching devices of said pairs of switching devices individually connecting first ones of said end taps of said power transformer secondary windings to second terminals of said pairs of power output terminals, means including second switching devices of said pairs of switching devices individually connecting second ones of said end taps of said power transformer secondary windings to said second terminals, first and second and third shorting switches individually connecting said intermediate taps of said power transformer secondary windings to said second power output terminals, each of said power switching devices and said shorting switches including an actuating circuit, means connecting said actuating circuits of said shorting switches to said third transformer for actuation of said shorting switches in response to each said energizing pulse applied to said third transformer, means individually connecting said actuating circuits of said first power switching devices to said impedance devices of said first sections of said phase-reversing networks, and means individually connecting said actuating circuits of said second power switching device to said impedance device of said second sections of said phase-reversing networks.

20. The combination of claim 19 in which said first and second valves are controlled rectifiers, said third and fourth valves are transistors, said switches of said phase reversing network are transistors, and each said circuit of said phase reversing network including a diode in series circuit with its respective said switch.

21. In an inverter for generating three phase electrical potential, a source of alternating potential of a frequency which is a multiple of the output frequency of said inverter, three flip-flop networks, each said network having a plurality of input terminals and a plurality of output terminals, means connecting said source to a pair of said input terminals and connecting some of said output terminals of a first of said networks to some of said input terminals of a second of said networks and connecting some of said output terminals of said second network to some of said input terminals of a third of said networks and connecting some of said output terminals of said third network to some of said input terminals of said first network whereby said networks are actuated in succession by following oscillations of said source of frequency, first and second saturable core transformers, each said transformer having a primary winding and secondary windings and control winding means, first circuit means series connecting said primary winding of said first transformer and a first pair of said output terminals of each of said flip-flop networks, second circuit means series connecting said primary winding of said second transformer and a second pair of said output terminals of each of said flip-flop networks, three pair of flip-flop circuits, each said flip-flop circuit having a pair of input terminals and a pair of output terminals and a pair of control terminals, third circuit means connecting said input terminals of a first pair of said pairs of flip-flop circuits to a plurality of said output terminals of said first flip-flop network, fourth circuit means connecting said input terminals of a second pair of said pairs of flip-flop circuits to a plurality of said output terminals of said second flip-flop network, fifth circuit means connecting said input terminals of a third pair of said pairs of flip-flop circuits to a plurality of said output terminals of said third flip-flop network, sixth circuit means individually connecting said pair of terminals of one of said flip-flop circuits of each of said pair of flip-flop circuits to said secondary windings of said first transformer, seventh circuit means individually connecting said pair of terminals of the other of said flip-flop circuits of each of said pair of flip-flop circuits to said secondary windings of said second transformer, said sixth and seventh circuit means being so polarized that during one instant said first transformer is effective to actuate said one flip-flop circuit to their first operating condition and during a second interval said second transformer is effective to actuate said other flip-flop circuits to their first operating condition, a power transformer having primary winding means and three secondary windings, each of said secondary windings of said power transformer having electrically spaced terminals and a third terminal intermediate said spaced terminals, three power output terminals, three pair of bidirectional current conducting switches, each said switch having a current conducting path and control means for controlling current through said paths, eighth circuit means individually connecting said paths of a first pair of said pairs of switches between one of said power output terminals and said spaced terminals of a first of said power transformer secondary windings, ninth circuit means individually connecting said paths of a second pair of said pairs of switches between a second of said power output terminals and said spaced terminals of a second of said power transformer secondary windings, tenth circuit means individually connecting said paths of a third pair of said pairs of switches between a third of said power output terminals and said spaced terminals of a third of said power transformer secondary windings, eleventh circuit means individually connecting said control means of said first pair of switches to said output terminals of said first pair of flip-flop circuits, twelfth circuit means individually connecting said control means of said second pair of switches to said output terminals of said second pair of flip-flop circuits, thirteenth circuit means individually connecting said control means of said third pair of switches to said output terminals of said third pair of flip-flop circuits, a pair of power input terminals, first and second power circuits connecting said power input terminals and said primary winding means of said power transformer, each said power circuit including a control device for regulating current flow therethrough, means individually connecting said control devices to said saturating core transformers and effective as a consequence of the saturation thereof to reverse the conductive conditions of said power circuits, conductor means connecting together said third terminals of said secondary windings of said power transformer, and switch means for individually connecting said power output terminals to said conductor means.

References Cited by the Examiner

UNITED STATES PATENTS

| | | | |
|---|---|---|---|
| 3,181,053 | 4/1965 | Amato | 321—45 |
| 3,246,231 | 4/1966 | Clarke | 321—69 |
| 3,257,601 | 6/1966 | Bizouard et al. | 321—5 |

JOHN F. COUCH, *Primary Examiner.*

W. H. BEHA, *Assistant Examiner.*